Nov. 5, 1957  R. K. WENTZ  2,812,109
CONTAINER
Filed May 11, 1954

INVENTOR.
RICHARD K. WENTZ
BY
*Billy J. Corber*

United States Patent Office 2,812,109
Patented Nov. 5, 1957

2,812,109

CONTAINER

Richard K. Wentz, Baltimore, Md.

Application May 11, 1954, Serial No. 428,877

7 Claims. (Cl. 222—52)

This invention relates to a container for storing and dispensing carbonated beverages, and the like, wherein means are provided for automatically maintaining the pressure inside the container always greater than the outside pressure. In this manner the desired gas content of the liquid within the container may be maintained, even though the volume of the liquid may be reduced.

An object of this invention is to provide a container for carbonated beverages, and the like, which will allow withdrawing a portion of the liquid from the container while still maintaining a pressure on the remaining part of the liquid which is of sufficient magnitude that the remaining liquid will not lose its effervescent characteristics. Conventional containers for carbonated beverages, and the like, in use today, are initially sealed under a pressure greater than atmospheric so that their effervescent characteristics are maintained until the seal is broken. With these conventional containers, after the seal has been broken and the liquid is exposed to atmospheric pressure, the liquid soon loses its effervescent characteristics and becomes worthless. Because of this, it has heretofore been necessary to package carbonated beverages, and the like, in individual units small enough to be used immediately upon opening. This limitation on packaging is overcome by employing the teaching of this invention, wherein any desired quantity of the liquid may be stored in a single container and withdrawn in fractional quantities without substantially changing the pressure applied to the liquid remaining inside the container, and thus without changing its effervescent characteristics. Also, the container of this invention, by virtue of its construction, will conserve space and readily fit inside an ordinary home refrigerator.

Another object of this invention is to provide a container having a source of gas under pressure which is fed into the container automatically in response to a change in the pressure differential which exists between the inside and outside of the container, whereby the liquid stored therein is held under substantially the same pressure irrespective of the quantity of the liquid.

Another object of this invention is to provide a container for storing and dispensing carbonated beverages, and the like, which has no parts protruding outwardly beyond the container walls, whereby the same may be handled with considerable roughness without being damaged.

Still another object of this invention is to provide a container for carbonated beverages, and the like, which, when moved from a warm to a cool environment, will maintain a substantially constant internal pressure relative to the surrounding air pressure to dispense the material from within the container with substantially the same force. This is particularly important with a carbonated beverage, since the force with which the liquid is withdrawn from the container has a large effect on the rate at which the carbon dioxide dissolves out of solution.

Further and other objects will become apparent from a reading of the following description, especially when considered in combination with the accompanying drawings, wherein like numerals refer to like parts.

Figure 1:
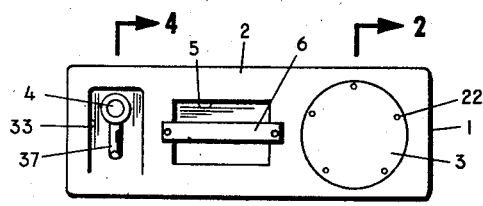
Figure 1 is a front elevation view of the container.

Referring now to the drawing, the container comprises a generally rectangular outer housing 1, having the front wall 2 thereof arranged to carry the pressurizing means 3 and the dispensing valve 4. As shown in Figure 1, a recess 5 is formed in front 2 of the container to provide a finger well for a flush mounted handle 6. This handle arrangement provides a convenient means for carrying the container, and yet does not require any portion of the handle to project outwardly beyond the wall of the rectangular housing.

Figure 2:
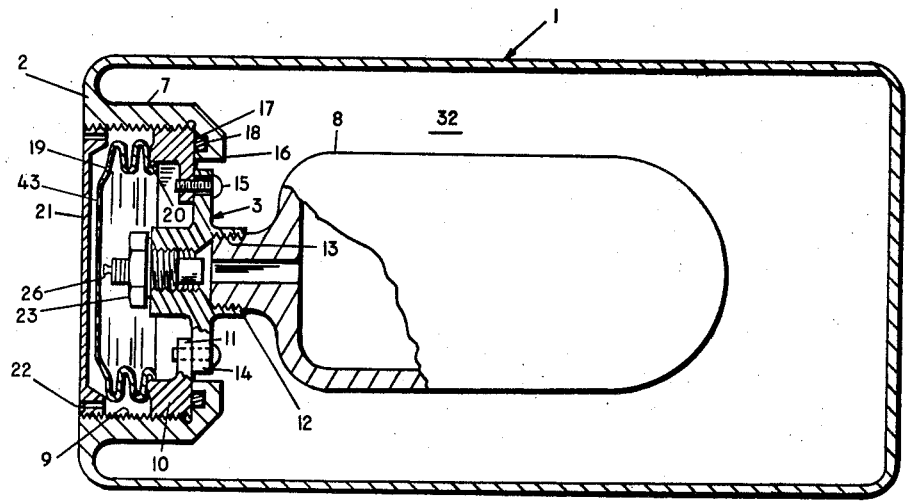
Figure 2 is a fragmentary sectional view taken approximately on line 2—2 of Figure 1.

The means for maintaining pressure within housing 1 always greater than the air pressure surrounding the housing is shown in Figure 2, wherein an annular sleeve 7 is secured to front 2 of the container and extends into the interior of housing 1 for supporting a gas filled pressure vessel 8. Sleeve 7 is provided with internal threads 9, which engage a threaded washer-like member 10 having radially inwardly directed lugs 11 at spaced points therearound. A hub 12 carried by lugs 11 and having a threaded opening 13 extending therethrough generally coaxially with sleeve 7, is adapted to receive one end of the pressure vessel and rigidly support the same within the container. Lugs 14 are provided on hub 12 and extend radially outwardly therefrom to engage lugs 11 on washer-like member 10 for rigidly mounting the assembly to outer housing 1 of the container through sleeve 7. To allow easy assembly and disassembly of the parts, lugs 11 and 14 are secured together by means of screws 15. A radially inwardly directed flange 16, carried in the inner end of sleeve 7, provides a seat for washer-like member 10. Flange 16 is provided with an annular notch 17 for confining a suitable sealing element 18 therein to prevent leakage of fluid from the inside to the outside of the container between sleeve 7 and member 10.

A pressure sensitive bellows type diaphragm 19 is fixedly secured within sleeve 7 to washer-like member 10 by means of an annular projection 20. The bellows diaphragm seals the opening into the container so that pressure inside housing 1 will react against one side of the diaphragm and pressure on the outside of housing 1 will react against the opposite side of the diaphragm. A cover plate 21 is placed over diaphragm 19 to prevent the same from being damaged. Cover 21 threadedly engages sleeve 7 and is flush mounted with respect to front 2 of the container so that it can be removed only by the use of special tools. A plurality of air inlet ports 22 are formed in cover plate 21 at the outer periphery thereof to admit the air surrounding the container into the area between diaphragm 19 and cover plate 21. It should be noted in Figure 2 that ports 22 are located relative to diaphragm 19 such that objects inserted through the ports will not interfere with the diaphragm.

Figure 3:
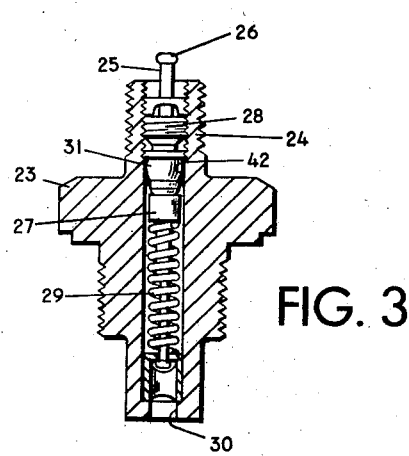
Figure 3 is a detail sectional view of the pressure control valve.

Head 43 of diaphragm 19 is positioned within sleeve 7 according to the differential pressure between the inside and the outside of the container. For a given differential pressure, head 43 will maintain a certain position. This feature or characteristic of the bellows type diaphragm is utilized to automatically control the operation of a pressure control valve 23 carried within tubular opening 13 in hub 12. As best shown in Figure 3, valve 23 comprises a valve stem 24 having a generally cylindrical bore extending axially therethrough for receiving a valve core 25. The valve core includes a control rod 26 to which is rigidly secured a valve seat 27. A valve seat engaging member 28, concentrically arranged relative to stem 26, threadedly engages the bore of stem 24 to hold the valve core in a normally closed position, wherein the valve seat 27 and the valve seat engaging member 28 are in fluid tight contact. This normally closed position of the valve, wherein the valve seat and engaging members are in contact with each other, is effected by a spring 29 forming a part of valve core 25, which acts between valve seat 27 and flange 30 on the high pressure end of stem 24 to urge the seat against its engaging member 28. A sealing washer 31, carried by valve seat engaging member 28, tightly engages the wall 42 of stem 24 surrounding the valve core and prevents fluid flow around the valve. Only when valve seat 27 and seat engaging member 28 are disengaged will fluid be allowed to flow from the high pressure side of the valve to the low pressure side through an inner channel formed in valve seating member 28. Normally, spring 29 will maintain the valve closed to the flow of fluid therethrough and only when control rod 26 is moved axially toward the high pressure side of the valve will the latter open and allow fluid to pass therethrough.

Control rod 26 projects beyond the end of stem 24 on the low pressure side of valve 23 and, as shown in Figure 2, extends generally coaxially with sleeve 7 and is located adjacent head 43 of diaphragm 19 such that when the diaphragm moves towards valve 23 it will engage control rod 26, exerting a force thereon sufficient to open the valve. When this occurs the gas within pressure vessel 8 is allowed to flow therefrom through valve 23 and into the main container chamber 32, thus increasing the pressure on the inner side of diaphragm 19 and causing it to move outwardly and away from control rod 26. Thus, valve 23 will again close to prevent increasing the pressure within the main chamber of the container beyond a predetermined amount determined by the particular design of the bellows type diaphragm and its normal location relative to valve 23. Whenever the pressure within container 1 drops below a certain desired value relative to the pressure surrounding the container which acts on the outer surface of the diaphragm, valve 23 will open, allowing gas from pressure vessel 8 to flow into main container chamber 32 until the pressure on the inner side of diaphragm 19 has again reached the desired value sufficient to move the diaphragm out of contact with valve 23.

The quantity of gas required for pressure vessel 8 is that quantity which will pressurize the main container chamber 32 as well as the pressure vessel at the desired pressure level when the container is otherwise empty. When this design condition is met the bellows type diaphragm 19 will automatically control the operation of valve 23 to maintain the liquid within the container under a pressure which is always greater than the pressure on the outside of the container by an amount which is at least equal to the desired pressure differential which is designed into the diaphragm and valve structure.

Figure 4:
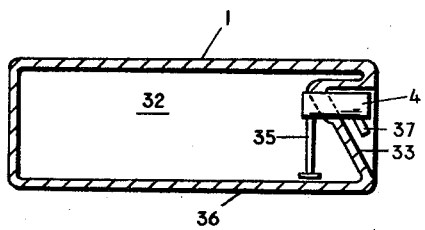
Figure 4 is a sectional view taken approximately on line 4—4 of Figure 1.

A recess 33 is formed in front wall 2 of housing 1, as best shown in Figure 4, for mounting the fluid dispensing valve 4 so that it will not project beyond the outer confines of the rectangular housing. A receiving tube 35 extends from the inlet side of valve 4 downwardly to a point closely adjacent bottom wall 36 of housing 1, so that all the liquid within the container may be removed through valve 4 when the container is lying bottom down on a horizontal shelf. The pressure differential existing between the inside and outside of the container causes the liquid to flow through the valve automatically when in the open position. Outlet tube 37 of valve 4 is directed downwardly and outwardly within recess 33 so that a drinking container may be easily filled from the dispensing valve.

Figure 5:
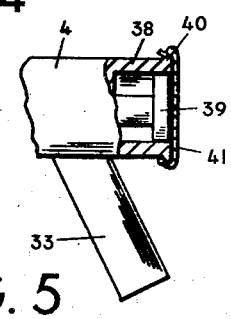
Figure 5 is a fragmentary side elevation view of the dispenser valve.

As best shown in Figure 5, valve 4 includes an outer housing 38 and a manually operable plunger type actuator 39 which will open the valve when pushed inwardly.

In certain uses of the container, such as in the sale of carbonated beverages and the like to the public, it is essential that the container be sealed in a manner which will positively indicate whether or not it has been opened or tampered with since it was originally filled. This may be done by any suitable means such as providing dispenser valve housing 38 with a flange 40 which will secure a conventional bottle cap 41 over valve actuator 39.

In using the container, pressure vessel 8 is filled with a suitable gas through valve 23 to provide the desired pressure potential. Then the carbonated beverage, or the like, is poured into the main chamber 32 of the housing while holding the diaphragm out of contact with the valve control rod. When the container is filled with the liquid, the diaphragm is released and if the pressure in the container is not at a predetermined level which is considered desirable the diaphragm will cause valve 23 to open and allow the gas from the pressure reservoir to escape into the lower pressure area of main chamber 32 until the pressure therein has increased to a value which will force the diaphragm outwardly and out of contact with the valve control rod 26. Holes 22 in cover plate 21 maintain the air pressure acting on the outside of diaphragm 19 at the same pressure as the air surrounding the container. As liquid is withdrawn from the container through dispensing valve 4 the pressure within main chamber 32 obviously starts to decrease. As the pressure level within main chamber 32 begins to lower, diaphragm 19 moves inwardly toward valve 23, contacting control rod 26 which opens the valve and allows gas to flow from pressure vessel 8 into primary chamber 32 and replace the withdrawn liquid with gas, thus maintaining the pressure substantially constant irrespective of the amount of liquid remaining in the container.

While the container is described for use in connection with carbonated beverages and the like, it is useful whenever it is advantageous to withdraw a portion of any fluent substance without exposing the remaining portion to the atmosphere. It is therefore to be understood that certain alterations, modifications and substitutions may be made to the instant disclosure without departing from the spirit and scope of this invention as defined by the appended claims.

I claim:

1. A portable container adapted to fit inside an ordinary home refrigerator for storing and dispensing effervescent liquids, and the like, comprising, a generally rectangular housing, said housing having an opening formed in one end thereof, a sleeve secured to said housing within said opening, a washer-like member threadedly engaging said sleeve, a pressure tight sealing ring carried by said sleeve and engaging said bushing to provide a fluid tight connection therebetween a radially inwardly directed flange formed on said bushing, a bellows type diaphragm carried by said flange within said sleeve and maintaining a fluid tight relationship therebetween, a hollow hub axially aligned with the opening in said housing and connecting with said bushing for support between said diaphragm and the inside of said container, a fluid filled pressure vessel carried within said container by said hub, said pressure vessel having an opening formed therein in communication with said hollow hub, a uni-directional valve carried by said hollow hub and allowing the flow of fluid from said pressure vessel to the inside of said container only in response to a force exerted thereon by said diaphragm, a protective cap carried by said housing and covering said diaphragm and limiting the movement thereof away from said valve, said cap having an opening formed therethrough for maintaining outside air pressure on the exterior surface of said diaphragm, said diaphragm being responsive to the differential pressure between the outside air and the fluid within said container for automatically controlling the operation of said valve whereby the pressure within said container is maintained always greater than the outside air pressure, and manually operable valve means carried by said container communicating with the interior thereof for removing desired quantities of the liquid carried therein.

2. A container for storing a fluent substance comprising, a housing defining the exterior of said container, a mechanism carried within said housing and maintaining the pressure within said container always greater than atmospheric pressure, and a spigot-like device for withdrawing the fluent substance stored in said container.

3. A container as set forth in claim 2, wherein said mechanism carried by said housing comprises a bellows type diaphragm responsive to the pressure differential between the outside and inside of said container for always maintaining the inside pressure greater than atmospheric pressure.

4. A container for storing and dispensing carbonated beverages, and the like, comprising, a generally rectangular housing forming an enclosed cavity for storing a liquid, a diaphragm carried by said housing at one end thereof in communication with said cavity and with the outside of said housing, a gas filled pressure vessel carried within said housing for pressurizing said cavity, valve means connecting with said pressure vessel and arranged adjacent said diaphragm for providing fluid communication between the pressure vessel and said cavity only in response to a force exerted on said valve by said diaphragm, a protective cap carried by said housing and shielding said diaphragm, said cap having an opening formed therein for maintaining the air pressure acting on said diaphragm substantially equal to the air pressure surrounding said container whereby the pressure within said cavity is maintained always greater than the outside air pressure, and manually operable valve means carried by said housing and communicating with said cavity for dispensing the liquid therefrom as desired.

5. A portable container adapted to fit inside an ordinary home refrigerator for storing and dispensing effervescent liquids and the like comprising, an outer housing defining an enclosed cavity for storing a quantity of said liquid, high pressure gas supply means carried by said housing and communicating with said cavity, a uni-directional valve interposed between said gas supply means and said cavity and allowing the flow of gas into said cavity for pressurizing the liquid only in response to a force exerted on the valve from within said cavity, a portion of said housing adjacent said valve being movable relative to said valve for exerting a force thereon in response to a variation in the pressure differential between the inside and outside of said housing whereby to allow gas flow into said cavity for maintaining a substantially constant pressure therein, a rigid cap enclosing said movable portion and connecting with said housing, said cap having an opening formed therein for admitting the outside air, and manually operable valve means carried by said housing and communicating with said cavity for removing the liquid stored therein.

6. A portable container adapted to fit inside an ordinary home refrigerator for storing and dispensing carbonated liquids, and the like, comprising, a generally rectangular housing forming an enclosed cavity for storing said liquid, pressure supply means carried by said housing within the confines of said rectangular housing and being responsive to the differential pressure between the inside and outside of said container for always maintaining the pressure inside said container greater than the atmospheric pressure and at a substantially constant pressure differential irrespective of the quantity of liquid stored therein, and a dispenser valve carried by said housing and communicating with said cavity for selectively withdrawing desired quantities of said liquid, said valve being recessed into one wall of said housing so as not to protrude beyond the generally rectangular confines of said housing.

7. A portable container for storing and dispensing effervescent liquids, comprising a housing having an opening formed therein, a cylindrical sleeve secured to said housing within said opening and extending inwardly therefrom, an inwardly directed radial flange formed on the inner end of said sleeve, a bushing inserted in said sleeve in threaded engagement between the inner surface of said sleeve and the outer periphery of said bushing, a sealing ring carried by said radial flange and engaging said bushing to form a pressure-tight seal therebetween, a hub member having an opening formed axially therethrough and carried by said bushing in axial alignment therewith, a bellows type diaphragm carried by said bushing and forming a pressure seal between the inside of said housing and the atmosphere, a pressure vessel carried within said container by said hub, said pressure vessel having an opening formed therein in communication with the opening in said hub, a uni-directional valve carried by said hub and allowing flow from said pressure vessel to the inside of said housing in response to inward motion of said diaphragm when the pressure within said housing falls below atmospheric pressure by more than a pre-selected amount, a protective cap carried by said housing and covering said diaphragm, said cap having an opening formed therethrough for maintaining atmospheric pressure on the exterior surface of said diaphragm, and manually operable valve means carried by the housing and communicating with the interior thereof for removing desired quantities of liquid therefrom.

References Cited in the file of this patent

UNITED STATES PATENTS

| | | |
|---|---|---|
| 1,959,815 | Corcoran | May 22, 1934 |
| 2,009,467 | Amsdell | July 30, 1935 |
| 2,514,773 | Kromer | July 11, 1950 |
| 2,571,433 | Fine et al. | Oct. 16, 1951 |
| 2,638,107 | Teague | May 12, 1953 |

FOREIGN PATENTS

| | | |
|---|---|---|
| 26,994 | France | Mar. 20, 1924 |